United States Patent [19]

Cocuzza et al.

[11] 4,094,962

[45] June 13, 1978

[54] PROCESS FOR PRODUCING HYDROGEN AND SULFUR FROM HYDROGEN SULFIDE

[75] Inventors: Gioacchino Cocuzza, Catania; Giuseppe Musso, Osmate (Varese), both of Italy

[73] Assignee: Societa' Italiana Resine S.I.R. S.p.A., Milan, Italy

[21] Appl. No.: 783,597

[22] Filed: Apr. 1, 1977

[51] Int. Cl.$^2$ .................... C01B 17/04; C01B 17/06; C01B 1/05

[52] U.S. Cl. .................... 423/573 R; 423/224; 423/507; 423/648 R

[58] Field of Search ............... 423/224, 573, 497, 507, 423/648

[56] References Cited

U.S. PATENT DOCUMENTS

| | | | |
|---|---|---|---|
| 1,034,646 | 8/1912 | Rabenalt | 423/573 |
| 2,121,793 | 6/1938 | Goshorn et al. | 423/224 |
| 3,365,276 | 1/1968 | Childs et al. | 423/507 X |

FOREIGN PATENT DOCUMENTS 2,516,441  10/1975  Germany .............. 423/648

*Primary Examiner*—G. O. Peters
*Attorney, Agent, or Firm*—Sughrue, Rothwell, Mion, Zinn and Macpeak

[57] ABSTRACT

Hydrogen and sulfur are produced from hydrogen sulfide by reacting the latter with iodine in an aqueous solution of hydriodic acid, recovering the sulfur thus formed, removing any unreacted hydrogen sulfide from the solution, rectifying said solution thereby to obtain hydrogen iodide and a residual hydriodic acid solution and thermally dissociating the hydrogen iodide to form hydrogen and iodine. The hydrogen is separated by diffusion and recovered. The unreacted hydrogen sulfide thus removed, the residual solution and the iodine are recycled.

12 Claims, 1 Drawing Figure

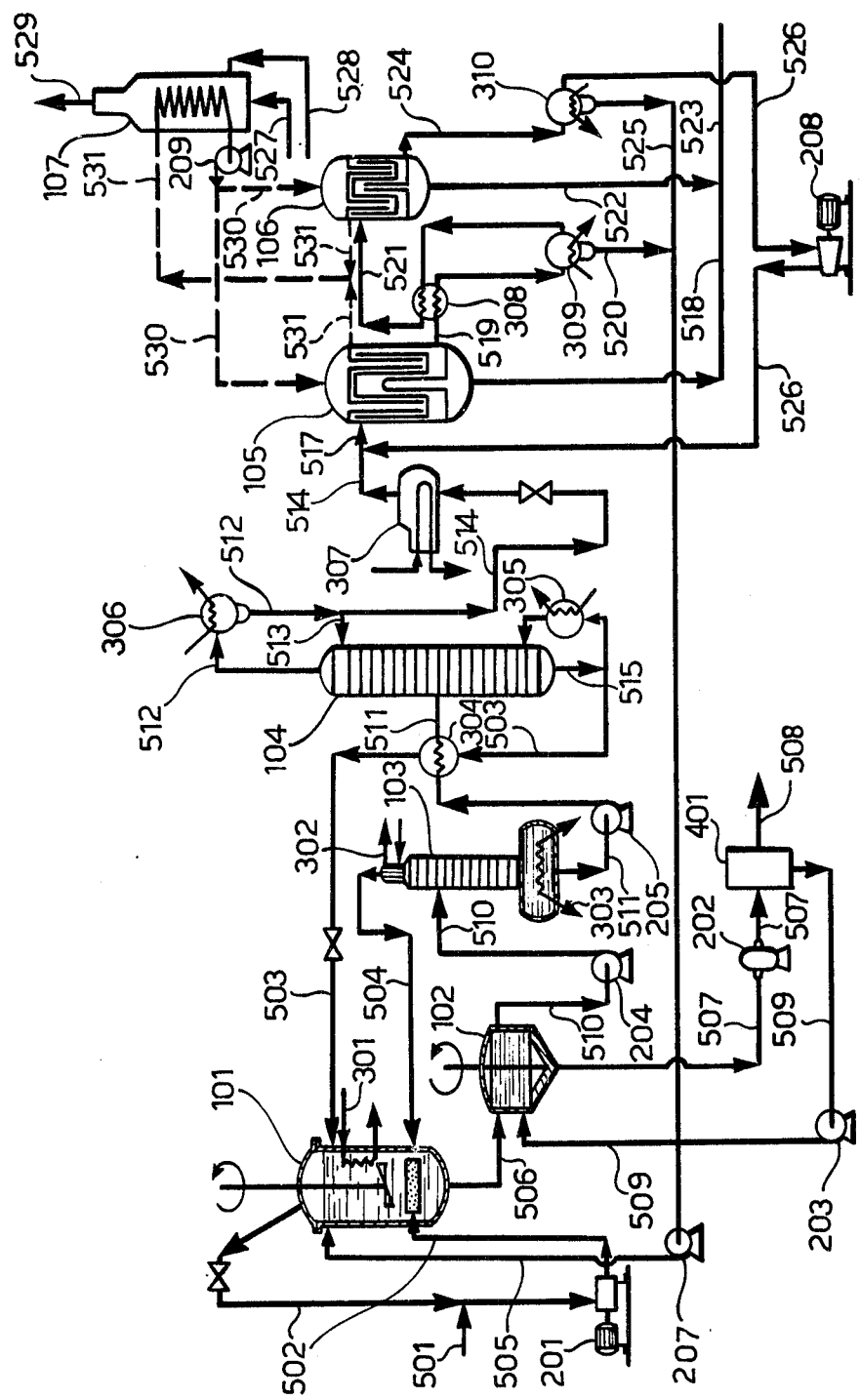

PROCESS FOR PRODUCING HYDROGEN AND SULFUR FROM HYDROGEN SULFIDE

BACKGROUND OF THE INVENTION

The present invention relates to a continuous process for producing hydrogen and sulphur from hydrogen sulfide.

Hydrogen sulfide is one of the commonest by-products of petroleum refining operations and therefore the question of its separation and utilization arises.

As is known, the sulfur contained in crude petroleum tends to accumulate in the heavy fractions obtained from the primary distillation of the petroleum. These heavy fractions are subjected to hydro-desulfuration so as to produce fuel oils which are non-polluting or only slightly polluting.

Other sources of hydrogen sulfide are natural gas and synthetic gases obtained by cracking of certain petroleum cuts or of carbon. The hydrogen sulfide is generally removed from these gases by scrubbing with an alkaline solution.

According to a method widely used in the art, the sulfur is then recovered by partial combustion of the hydrogen sulfide once the latter has been isolated. This results in wastage of the hydrogen which burns to form water.

It is now felt desirable to recover the hydrogen together with the sulfur, especially in view of the fact that the hydro-desulfuration operations require large quantities of hydrogen resulting in high costs of the refined products.

Recovery of the sulfur and hydrogen by simple thermal decomposition of the hydrogen sulfide is not industrially expedient because of the excessively high temperatures needed to shift the equilibrium in favour of the dissociation products.

The object of the present invention is to provide an economically viable method of recovering both hydrogen and sulfur from hydrogen sulfide.

SUMMARY OF THE INVENTION

According to the invention there is provided a process for producing hydrogen and sulphur from hydrogen sulfide, which comprises:

(a) contacting hydrogen sulfide and iodine in a molar excess of said hydrogen sulfide with respect to said iodine, in an aqueous solution of hydrogen iodide containing from 50 to about 20% by weight of hydrogen iodide, at a temperature of from 10° to 80° C and at a pressure equal to or higher than atmospheric, thereby to convert said iodine into hydrogen iodide and form sulphur by reaction between said iodine and hydrogen sulfide, the amount of iodine being such as to obtain an aqueous suspension of sulphur, containing in dissolved form unreacted hydrogen sulfide, having a content of hydrogen iodide not exceeding 50% by weight;

(b) recovering said sulphur from said suspension;

(c) desorbing hydrogen sulfide from the resulting solution and recycling said desorbed hydrogen sulfide to stage (a);

(d) rectifying in a distillation column the residual solution obtained in (c), at superatmospheric pressure, thereby to recover hydrogen iodide at the top and an aqueous solution of hydrogen iodide at the bottom, said aqueous solution having a content of hydrogen iodide equal to or higher than that of the water-hydrogen iodide azeotrope at the operating pressure, and recycling said aqueous solution of (d) to stage (a);

(e) forming hydrogen and iodine by thermal dissociation of the hydrogen iodide recovered in (d), at a temperature of at least 400° C and a pressure of at least 10 atmospheres, while removing hydrogen from the resulting mixture by diffusion through one or more membranes of palladium alloy and recovering said hydrogen having diffused, recovering iodine from the resulting residual mixture and recycling said recovered iodine to stage (a).

More particularly, the stages of the process may in practice by carried out as follows.

Stage (a)

According to the present invention, hydrogen sulfide and iodine are brought into contact in a first reaction stage to form hydrogen iodide and sulfur according to the equation:

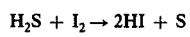

$$H_2S + I_2 \rightarrow 2HI + S$$

This reaction is preferably carried out with an amount of hydrogen sulfide in excess over the stoichiometric quantity required for the reaction.

In particular, from 105 to 150 moles of hydrogen sulfide may be introduced for each 100 moles of iodine, thus ensuring the absence of unconverted iodine in the reaction products.

This first stage is carried out in an aqueous solution of hydriodic acid which is recycled from stage (d). Generally, said aqueous solution contains from about 40 to about 20 wt.%, and preferably about 30 wt.%, of hydrogen iodide. It is also expedient to introduce the iodine in molten form, for example at a temperature of about 150° C, in order to facilitate its solvation in the reaction medium.

The reaction temperature may range from 10° to 80° C, temperatures of the order of 30° C being preferred. The pressure is usually maintained at a value of from 1 to 5 atmospheres, a pressure of the order of 2 atmospheres being preferred.

Under these conditions the times necessary for complete, or practically complete conversion of the iodine are of the order of 1-3 hours and typically around 2 hours.

In each case a suspension of sulfur in an aqueous solution of hydriodic acid, in which the concentration of hydrogen iodide does not exceed 50% by weight is obtained, the concentration of the hydrogen iodide being preferably of the order of 40% by weight.

In the first reaction stage a reactor is used which is preferably fitted with a stirrer, heat exchange means and with a spray nozzle for the hydrogen sulfide at the bottom.

In a preferred embodiment, two or more reactors in series are used, the iodine and the aqueous solution of hydriodic acid being fed to the first reactor and the hydrogen sulfide to the last reactor, so as to operate in counter-current and to discharge from the last reactor a solution rich in hydriodic acid and free, or substantially free from iodine.

Stage (b)

The sulfur is recovered from the suspension obtained in (a) by sedimentation, by decanting said suspension generally at ambient temperatures (20°-25° C) and within the range of pressures employed in stage (a).

Thus a thick slurry consisting for the most part of sulfur is obtained, from which the sulfur is further separated by means of, for example, a centrifugal filter.

The filtrate, constituting the mother liquor, is recycled to the decanter, whilst the cake of sulfur is washed and dried.

Stage (c)

The aqueous solution of hydriodic acid from stage (b) is submitted to stripping by heating in order to remove the absorbed hydrogen sulfide from the aqueous solution. This is preferably carried out in a desorbing column having 10 theoretical plates, maintaining at the head a temperature of about 20° C and at the foot a temperature close to the boiling temperature of the solution of hydriodic acid.

The column is fitted at the head with a condenser in which a cooling liquid, e.g. water, circulates. The bottom of the column may be heated by means of steam or hot water. The column is generally operated at a pressure equal to, or about equal to the operating pressure of stage (a).

The hydrogen sulfide, possibly mixed with small quantities of water, is recycled to stage (a).

According to another embodiment, stripping of the hydrogen sulfide is effected by heating accompanied by the blowing of an inert gas (e.g. nitrogen) through the solution.

Stage (d)

The aqueous solution of hydriodic acid obtained in (c), is rectified at a pressure of from 20 to 200 atmospheres to recover hydrogen iodide at the top of the rectifying column and, at the bottom, an aqueous solution of hydriodic acid having a concentration of acid equal to, or higher than that of the $H_2O$—$HI$ azeotrope at the operating pressure.

It is known that the composition of the water-hydrogen halide azeotropes depends on the pressure. The higher the pressure, the lower is the concentration of hydrogen halide in the corresponding azeotropic mixture.

More particularly, the rectification of the hydrogen iodide is carried out at such a pressure that the concentration of hydrogen iodide in the corresponding azeotrope be lower than the concentration of said acid in the solution fed in.

The use of high pressures prevents, moreover, leakage of air into the column which might oxidize the hydrogen iodide into elemental iodine.

Operation is typically carried out in a column having 25 theoretical plates, with a reflux ratio equal to 4 and at a pressure of 50 atmospheres.

The heat necessary for the rectification operations is supplied to the reboiler by circulating steam at high pressure or a suitable diathermic fluid.

The top of the column is fitted with a condenser with circulation of cooling water. The aqueous solution of hydriodic acid having a concentration equal to, or higher than the azeotropic one, is discharged from the bottom of the column and recycled to stage (a).

According to a preferred embodiment, the aqueous solution discharged under pressure is used to run a water turbine, thereby to recover the energy supplied.

Stage (e)

The hydrogen iodide of stage (d) is dissociated at a temperature of from 400° to 900° C and at a pressure of from 10 to 100 atmospheres.

The dissociation is preferably carried out at 600°-800° C and at a pressure of 30 atmospheres in two or more reactors in series, containing membranes of palladium alloy on a porous ceramic support or a sintered metal support, formed into a cartridge. The hydrogen, gradually formed by dissociation of the hydrogen iodide, is thus separated by diffusion through the membranes.

The use of these hydrogen-permeable membranes permits a shifting of the dissociation equilibrium by substracting hydrogen as well as the obtaining of high degrees of dissociation of the hydrogen iodide. Moreover, palladium acts as a catalyst for said dissociation.

The heat necessary for the dissociation may be supplied by circulating a condensing fluid or a hot fluid through a tube bundle. This fluid may be the gaseous cooling fluid used in a HTGR nuclear reactor.

The hydrogen is recovered in a collecting tank maintained at low pressure (e.g. 1.5 atmospheres). The iodine is separated by condensation in condensers placed intermiate the reactors and in a final condenser placed after the last reactor, and is recycled in the liquid state to stage (a). The gaseous effluent issuing from the final condenser comprising undissociated hydrogen iodide, hydrogen in volumetric percentage linked to the minimum pressure for diffusion through the membranes, and iodine in volumetric percentage linked to the vapor pressure at the condensation pressure. The gaseous effluent is conveniently recycled to the first reactor.

BRIEF DESCRIPTION OF THE DRAWING

One embodiment of the present invention will now be more particularly described with reference to the accompanying drawing which is a diagrammatic representation of a plant used for the process according to the present invention.

DETAILED DESCRIPTION OF THE ILLUSTRATED EMBODIMENT

In the following description, the parts and percentages are in moles unless otherwise specified.

Referring to the drawing, hydrogen sulfide and iodine are reacted in reactor 101 to form hydrogen iodide and sulfur according to the reaction:

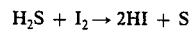

$$H_2S + I_2 \rightarrow 2HI + S$$

More particularly, reactor 101 is fed with an amount of hydrogen sulfide in excess over that stoichiometrically necessary for the reaction and the excess hydrogen sulfide is recycled through pipe 502.

The fresh hydrogen sulfide is delivered at a rate of about 100 parts per hour through pipe 501, combined with the recycle hydrogen sulfide and the whole is compressed in compressor 201 to 1.5 atmospheres and delivered to reactor 101 through pipe 502.

Reactor 101 is also fed with 400 parts per hour of hydrogen iodide and 6600 parts per hour of water, in the form of a dilute aqueous solution of hydriodic acid (pipe 503), with 100 parts per hour of iodine (pipe 505) and 28 parts per hour of a mixture consisting essentially of hydrogen sulfide and small amounts of water (pipe 504).

The iodine is delivered to reactor 101 in the molten state at a temperature of about 150° C.

Reactor 101 is fitted with a spray nozzle, for the hydrogen sulfide, at the bottom, a stirrer and a heat exchange coil 301. The said reactor is operated at a pressure of 1.5 atmospheres, at a temperature of about 30° C and with a residence time of 2 hours.

Under the above conditions practically complete conversion of the iodine is achieved and 7,328 parts per hour of a solution comprising 6600 parts of water, 600 parts of hydriodic acid, 100 parts of sulphur in suspension and 28 parts of dissolved hydrogen sulfide, are discharged from the bottom of the reactor through pipe 506. This solution is continuously delivered to decanter 102 wherein the sulphur settles. Decanter 102 is operated at a pressure of about 1.5 atmospheres and at ambient temperature.

The slurry discharged from the bottom of decanter 102 is delivered to centrifugal filter 401 through pipe 507 and pump 202. The sulphur thus separated is discharged through pipe 508 at a rate of about 100 parts by hour and then washed. The mother liquor is pumped back to decanter 102 through pipe 509 by pump 203.

The clarified liquid is continuously discharged from decanter 102 and pumped to column 103 through pipe 510 by pump 204. Column 103 has 10 theoretical plates and is fed at the level of the second plate from the top. Operation is carried out at a pressure of 2 atmospheres (at the top), a temperature of about 20° C being maintained at the top by water condenser 302 and a temperature close to the boiling temperature of the hydriodic acid solution being maintained at the bottom by circulating steam through coil 303.

Under these conditions practically all the hydrogen sulfide is removed in gaseous form at the top of the column (about 28 parts per hour) together with negligible amounts of water. This hydrogen sulfide is recycled to reactor 101 through pipe 504.

The bottom product, consisting of an aqueous solution of hydriodic acid, is discharged through pipe 511 by pump 205; at a rate of about 7200 parts per hour, and delivered to column 104 upon passage through heat exchanger 304.

Column 104 has 25 theoretical plates and is fed at the level of the 15th plate from the top. Column 104 operates at 50 atmospheres (at the top) and with a reflux ratio equal to 4.

Under these conditions, a lean solution of hydriodic acid is discharged at the bottom of column 104 through pipe 515. A fraction of this solution is recycled to column 104 upon passage in exchanger 305, and the remaining fraction (about 7000 parts per hour) is delivered to reactor 101 through pipe 503 upon passage in heat exchanger 304.

Hydrogen iodide is discharged at the top through pipe 512 and condensed in heat exchanger 306 in which cooling water circulates. Part of the hydrogen iodide is then returned to the top of column 104 as a reflux. The remaining fraction (200 parts per hour) is delivered through pipe 514 to evaporator 307 where the hydrogen iodide is heated to about 90° C, at a pressure of 30 atmospheres, by steam circulation. The gaseous hydrogen iodide is then mixed with 74 parts per hour of a recycle mixture delivered through line 526 and having the following volumetric composition: 7.5% hydrogen, 2.0% iodine and 90.5% hydrogen iodide. The joint mixture is then delivered to reactor 105 through line 517. This joint mixture, composed of 97.5% hydrogen iodide, 2% hydrogen and 0.5% iodine, is treated to dissociate the hydrogen iodide and separate the iodine and hydrogen resulting from the dissociation.

This dissociation is carried out in two reactors 105 and 106, in series with each other, fitted with membranes of palladium alloy supported on porous ceramic material, in the form of cartridges. Each reactor is provided with an internal bundle of tubes, inserted by bayonet connection, which conduct a flow of molten lead.

The lead is heated to about 900° C in furnace 107, to which fuel oil is fed through pipe 527 and air through pipe 528. The combustion gases are discharged through pipe 529. The molten lead is delivered to reactors 105 and 106 through lines 530 by pump 209, withdrawn from said reactors through lines 531 at a temperature of about 830° C and returned to furnace 107.

In reactor 105 the hydrogen iodide undergoes partial dissociation, at a pressure of 30 atmospheres and a temperature of about 800° C. Hydrogen is separated by diffusion through the membranes and is removed through pipe 518 at a rate of 62 parts per hour.

A mixture containing 63.6% hydrogen iodide, 4.6% hydrogen and 31.8% iodine is discharged from reactor 105 through pipe 519 at a rate of 212 parts per hour. This mixture is first cooled to 260° C in heat exchanger 308 and then to 150° C in a further heat exchanger 309 where the iodine separates by condensation and is discharged through pipe 520.

The residual mixture having the following volumetric composition: 92% hydrogen iodide, 6.6% hydrogen and 1.4% iodine is delivered to reactor 106 through pipe 521 upon passage in exchanger 308, at a rate of about 100 parts per hour.

The operation conditions in reactor 106 are similar to those in reactor 105, hydrogen being isolated and removed through pipe 522, combined with the hydrogen discharged through pipe 518 and the whole being discharged through pipe 523 at an average rate of about 100 parts per hour and at a pressure near to atmospheric.

A mixture composed of 61.7% hydrogen iodide, 5.1% hydrogen and 33.2% iodine is discharged from reactor 106 through pipe 524, at a rate of 108–109 parts per hour. This mixture is cooled in heat exchanger 310 thereby to separate the iodine. The iodine is discharged through pipe 525 at a rate of 34–35 parts per hour, combined with that of pipe 520 and the whole is recycled to reactor 101 through pipe 505 and pump 207.

The residual mixture is recycled from heat exchanger 310 to reactor 105 through pipes 526 and 517 and compressor 208.

We claim:

1. A process for producing hydrogen and sulfur from hydrogen sulfide, which comprises:
    (a) contacting hydrogen sulfide and iodine in a molar excess of said hydrogen sulfide with respect to said iodine, in an aqueous solution of hydriodic acid containing from 50 to about 20% by weight of hydrogen iodide, at a temperature of from 10° to 80° C and at a pressure equal to or higher than atmospheric, thereby to convert said iodine into hydrogen iodide and form sulphur by reaction between said iodine and hydrogen sulfide, the amount of iodine being such as to obtain an aqueous suspension of sulphur, containing in dissolved form unreacted hydrogen sulfide, having a content of hydrogen iodide not exceeding 50% by weight;
    (b) recovering said sulphur from said suspension;

(c) desorbing hydrogen sulfide from the resulting solution and recycling said desorbed hydrogen sulfide to stage (a);

(d) rectifying in a distillation column the residual solution obtained in (c), at superatmospheric pressure, thereby to recover hydrogen iodide at the top and an aqueous solution of hydriodic acid at the bottom, said aqueous solution having a content of hydrogen iodide equal to or higher than that of the water-hydrogen iodide azeotrope at the operating pressure, and recycling said aqueous solution of (d) to stage (a);

(e) forming hydrogen and iodine by thermal dissociation of the hydrogen iodide recovered in (d), at a temperature of at least 400° C and a pressure of at least 10 atmospheres, while removing hydrogen from the resulting mixture by diffusion through one or more membranes of palladium alloy and recovering said hydrogen having diffused, recovering iodine from the resulting residual mixture and recycling said recovered iodine to stage (a).

2. The process of claim 1, wherein said hydrogen sulfide of (a) is used in an amount of from 105 to 150 moles per each 100 moles of iodine.

3. The process of claim 1, wherein stage (a) is carried out at a pressure of from 1 to 5 atmospheres.

4. The process of claim 1, wherein the aqueous solution of (a) contains about 30 wt.% of hydrogen iodide and the aqueous suspension of (a) contains about 40 wt.% of hydrogen iodide.

5. The process of claim 1, wherein said sulphur is recovered from said suspension by sedimentation at ambient temperature and at atmospheric or superatmospheric pressure.

6. The process of claim 1, wherein said hydrogen sulfide is desorbed in a desorbing column having 10 theoretical plates, operated at a temperature of about 20° C at the top and, at the bottom, at a temperature close to the boiling temperature of the solution of (c).

7. The process of claim 1, wherein the distillation column of (d) is operated at a pressure of from 20 to 200 Atmospheres.

8. The process of claim 1, wherein the distillation column of (d) has 25 theoretical plates and is operated with a reflux ratio equal to 4.

9. The process of claim 1, wherein the thermal dissociation is carried out at a temperature of from 400° to 900° C and at a pressure of from 10 to 100 Atmospheres.

10. The process of claim 1, wherein the thermal dissociation is carried out at a temperature of from 600° to 800° C and at a pressure of about 30 Atmospheres.

11. The process of claim 1, wherein said iodine is recovered from the resulting residual mixture of (e) by condensation, the uncondensed fraction, consisting essentially of undissociated hydrogen iodide, being recycled to stage (d).

12. The process of claim 1, wherein said thermal dissociation is carried out in two or more reactors in series, feeding the hydrogen iodide recovered in (d) into the first reactor, recovering iodine by condensation from the residual mixture discharged from each reactor and introducing the uncondensed fraction, consisting essentially of undissociated hydrogen iodide, into the following reactor, the uncondensed fraction obtained from the residual mixture discharged from the last reactor being recycled to the first reactor.

* * * * *